(12) United States Patent
Preston et al.

(10) Patent No.: US 9,976,659 B2
(45) Date of Patent: May 22, 2018

(54) DECOMPRESSION COUPLING BLOCK

(71) Applicants: Duane S. Preston, Mentor, OH (US);
Albert E. Pacosky, Mentor, OH (US);
Neil S. Robins, East Sussex (GB)

(72) Inventors: Duane S. Preston, Mentor, OH (US);
Albert E. Pacosky, Mentor, OH (US);
Neil S. Robins, East Sussex (GB)

(73) Assignee: Holmbury, Ltd. (GB)

( * ) Notice: Subject to any disclaimer, the term of this patent is extended or adjusted under 35 U.S.C. 154(b) by 0 days. days.

(21) Appl. No.: 15/165,449

(22) Filed: May 26, 2016

(65) Prior Publication Data

US 2016/0348799 A1 Dec. 1, 2016

Related U.S. Application Data

(60) Provisional application No. 62/169,183, filed on Jun. 1, 2015.

(51) Int. Cl.
| | | |
|---|---|---|
| *F16L 37/00* | (2006.01) | |
| *F16K 15/02* | (2006.01) | |
| *F16K 15/04* | (2006.01) | |
| *F16K 31/60* | (2006.01) | |
| *E02F 3/36* | (2006.01) | |

(52) U.S. Cl.
CPC .......... *F16K 15/026* (2013.01); *E02F 3/3654* (2013.01); *F16K 15/044* (2013.01); *F16K 31/60* (2013.01)

(58) Field of Classification Search
CPC .................................................... E02F 3/3654

USPC ........................................ 137/614.03, 614.04
See application file for complete search history.

(56) References Cited

U.S. PATENT DOCUMENTS

| | | | | |
|---|---|---|---|---|
| 3,693,655 A | * | 9/1972 | Frisk ....................... | F16L 37/12 137/599.11 |
| 4,371,004 A | * | 2/1983 | Sysolin ................. | E02F 3/3654 137/614.04 |
| 4,773,217 A | * | 9/1988 | Angot ................... | E01C 19/282 404/133.05 |
| 4,881,573 A | * | 11/1989 | Durant ................... | F16L 37/23 137/614.04 |
| 4,953,592 A | * | 9/1990 | Takahashi ............... | F16L 37/32 137/599.11 |
| 5,592,970 A | | 1/1997 | Stucchi et al. | |
| 5,662,141 A | | 9/1997 | Arosio | |
| 5,873,386 A | | 2/1999 | Arosio | |
| 6,026,857 A | | 2/2000 | Stucchi | |
| 6,065,172 A | | 5/2000 | Swessel | |

(Continued)

*Primary Examiner* — John Fox
(74) *Attorney, Agent, or Firm* — Tarolli, Sundheim, Covell & Tummino LLP

(57) ABSTRACT

A decompression block assembly for coupling a source of hydraulic pressure to a hydraulically operated attachment. The assembly includes a valve body defining first and second ports that are fluidly connected to first and second couplers that are connectable to hoses of the attachment. The valve body includes a shuttle chamber having an opposed valve seats and a valve element engageable with the valve seats depending on residual pressure in fluid passages. A release member is operable to connect the shuttle valve to a drain port to discharge residual pressure in one or both fluid passages communicating with the attachment. The release member, when operated, opens a check valve in order to discharge residual pressure.

17 Claims, 16 Drawing Sheets

(56) References Cited

U.S. PATENT DOCUMENTS

| | | | |
|---|---|---|---|
| 6,302,147 B1 * | 10/2001 | Rose | F16L 37/56 |
| | | | 137/614.03 |
| 6,318,234 B1 | 11/2001 | Mate | |
| 6,588,806 B2 | 7/2003 | Arosio | |
| 6,647,721 B2 * | 11/2003 | Heyne | B60T 17/04 |
| | | | 137/115.13 |
| 6,659,130 B2 | 12/2003 | Arosio | |
| 6,814,340 B2 | 11/2004 | Arosio | |
| 6,840,276 B2 * | 1/2005 | Zeiber | F16L 29/04 |
| | | | 137/614.03 |
| 7,007,983 B2 | 3/2006 | Arosio | |
| 7,198,060 B2 * | 4/2007 | Hiser | F16K 27/003 |
| | | | 137/495 |
| 7,222,836 B2 | 5/2007 | Chen | |
| 7,454,906 B2 * | 11/2008 | Kauss | E02F 9/2207 |
| | | | 60/468 |
| 7,942,163 B2 | 5/2011 | Sauer | |
| 8,160,785 B2 * | 4/2012 | Kahle | E02F 3/3654 |
| | | | 701/50 |
| 8,205,641 B2 * | 6/2012 | Richardson | F15B 13/021 |
| | | | 137/523 |
| 8,567,436 B2 * | 10/2013 | Polgati | F15B 20/00 |
| | | | 137/595 |
| 8,567,438 B2 | 10/2013 | Tivelli | |
| 8,683,795 B1 * | 4/2014 | Beck | B64D 39/02 |
| | | | 60/468 |
| 9,347,594 B2 | 5/2016 | Rusconi | |
| 2007/0261403 A1 | 11/2007 | Eppler | |

* cited by examiner

DECOMPRESSION COUPLING BLOCK

RELATED APPLICATIONS

This application claims priority from U.S. Provisional Application Ser. No. 62/169,183, filed Jun. 1, 2015, the subject matter of which is incorporated herein in its entirety.

FIELD OF THE INVENTION

The present invention relates generally to fluid coupling devices and, in particular, to a decompression block used with quick couplers to enhance the functionality of quick coupling hydraulic systems.

BACKGROUND OF THE INVENTION

A trend in the construction industry has been to utilize smaller, more versatile machinery on the job-site. For example, mini-excavators and skid-steer loaders are often used to perform a variety of tasks. In many cases, a skid-steer loader or mini-excavator is equipped with an attachment for performing a particular task. Such attachments are typically powered by an auxiliary hydraulic circuit on the skid-steer loader or mini-excavator.

Numerous attachments exist for performing a variety of tasks. For example, attachments exist for allowing a skid-steer loader to be used as a backhoe, an earth auger, an angle broom, a drop hammer, a snowplow, a brush saw, etc. These attachments typically are designed to be quickly connected and disconnected from the skid-steer loader or other machine by an operator on the job-site. The ability to quickly change attachments on the job-site makes these smaller machines more versatile than larger machines.

Quick-disconnect couplers are often used to allow quick and convenient connection and disconnection of hydraulic lines of an attachment to the auxiliary hydraulic circuit of the machinery. These types of couplers also are often used on construction equipment or agricultural tractors for connecting auxiliary circuits that power work tools or pull behind implements. The couplers can be mounted at the end of piping, hoses or in manifolds in positions that are easily accessible to the operator when connecting an attachment. Generally the couplings are in close proximity to each other.

In general, an operator manually connects the hydraulic lines of an attachment to the auxiliary hydraulic circuit of the machine. To form the connection, a plug-like coupler part and a socket like coupler part are customarily used to couple the supply/return lines. In many instances, the connection is made while internal hydraulic pressure exists in one or both of the lines to be connected. Such internal hydraulic pressure can be residual hydraulic pressure build up in the hydraulic circuit or may be due to pressure in an attachment due to thermal expansion. Regardless, hydraulic pressure in the circuit can make forming the connection more difficult, especially with standard quick-disconnect couplers.

DISCLOSURE OF THE INVENTION

The present invention provides a new and improved decompression coupling block which can be operated to release residual pressure in the hydraulic system to enable hydraulic attachment hose assemblies to be coupled and decoupled from the hydraulic system. The decompression coupling block includes a pair of hose couplers by which hose assemblies are releasably coupled to the block. The decompression block includes ports that communicate with associated couplers. As is conventional, the ports are connected to control valving, such as a directional valve forming part of the hydraulic system. The valving selectively applies fluid pressure to one or both ports which, in turn, communicate the fluid pressure to the couplers and to a hydraulically operated attachment that is connected to the decompression block by associated hose assemblies.

According to the invention, the decompression block includes a shuttle valve that includes a pair of seats and a shuttle member located in a shuttle valve chamber. The shuttle valve member is engageable with one or the other seat. In the illustrated embodiment, the shuttle valve member comprises a ball.

In the exemplary embodiment, one seat of the shuttle valve communicates, via a first branch passage, with a first fluid pressure port-to-coupler passage that fluidly connects a first port with an associated coupler. The other seat of the shuttle valve communicates, via a second branch passage, with a second fluid pressure port-to-coupler passage that connects a second port with an associated coupler. Fluid pressures in the first and second port/coupler passages communicated to the shuttle valve chamber via the first and second branch passages urge the shuttle member towards one of the seats, depending on the relative pressures between the first and second port-to-coupler passages. If, for example, the first branch passage has a higher pressure than the second branch passage, the shuttle member or ball will be urged towards the seat associated with the second branch passage and inhibit fluid pressure from flowing from the first branch passage to the second branch passage.

The shuttle valve chamber communicates with a fluid pressure discharge valve via a branch return passage. In the illustrated embodiment the pressure discharge valve comprises check-like valve that includes a ball that is spring biased towards an associated seat. The seat communicates with a return passage or conduit such that when the ball is moved off its associated seat, fluid pressure in the shuttle valve chamber will be allowed to flow to the return passage or return conduit, which is typically connected to the tank of the hydraulic system. When the ball engages the seat the flow of fluid pressure from the shuttle valve chamber to the return passage/conduit is blocked.

According to the invention, when hose assembles are to be connected to, or disconnected from, the decompression coupler block, residual fluid pressures in the block i.e. in the port-to-coupler passages are discharged to the tank by the manipulation of a pressure relief actuating member by an equipment operator. In the illustrated embodiment, the pressure relieving operating member is pin-like and is slidably held by the decompression coupling block. The operating pin includes a frustoconical or tapered surface which is engageable with the ball that forms part of the pressure discharge valve.

In one embodiment, fluid pressure is relieved and discharged to the tank via the return passage/conduit by pulling the pressure relief operating pin which causes the frustoconical segment formed on the pin to engage and then raise a pressure discharge valve element off its seat and allow fluid pressure in the shuttle valve chamber to be discharged to the return conduit. In another embodiment, the pressure relief operating pin is pushed inwardly and it too includes a frustoconical surface or segment that engages and unseats the valve element when the pin is moved laterally allowing pressure in the shuttle valve chamber to be discharged to a return conduit. In both embodiments the pressure relief operating pin is biased toward a ball disengaged position by a suitable spring. In one embodiment, the valve element is a ball and in another embodiment, the valve element is a poppet.

The present invention provides a hydraulic connection assembly or decompression control assembly that is positioned between an onboard hydraulic system of the vehicle and a hydraulically operated attachment. The disclosed assembly has a discharge control which discharges residual pressure when hose assemblies from the hydraulically operated attachment are connected to or disconnected from the vehicle mounted hydraulic system. The assembly includes a valve body that is attachable to the vehicle and which includes first and second hydraulic ports and at least one drain port that is connected to a return line that communicates with a hydraulic tank forming part of the vehicle hydraulic system.

The valve further includes first and second hydraulic couplers that are connectable to first and second hydraulic lines extending from the hydraulically operated attachment. The valve body defines a first flow passage by which the first port is communicated with the first coupler and a second flow passage for communicating the second port with the second coupler. The valve body defines the drain passage communicating with the drain port. The assembly includes a shuttle valve chamber defining spaced apart, valve seats and a shuttle valve element located within the shuttle chamber engageable with the first or second valve seats. The first valve seat communicates with the first flow passage and the second valve seat communicates with the second flow passage. Under predetermined operating conditions, the shuttle chamber communicates with the drain passage. A spring biased check valve controls the communication of the shuttle chamber with the drain passage. A release member is operatively engageable with the spring biased check valve and when moved to a release position, unseats the check valve to allow the shuttle chamber to communicate with the drain passage. The shuttle valve element is engageable with the second seat when a fluid pressure in the first slow passage is greater than the fluid pressure in the second flow passage and the shuttle valve element is engageable with the first seat when a fluid pressure in the second flow passage is greater than a fluid pressure in the first flow passage.

In one disclosed embodiment, the release member is pulled axially in order to cause the engagement of a tapered segment with the spring biased check valve eventually unseating the check valve to communicate residual pressure to the drain passage. In an alternate embodiment, the release member is pushed to move the member axially in order for a tapered segment forming part of the release member to engage and unseat the spring biased check valve.

In a third embodiment, the release member is rotated about an axis in order to unseat the spring biased check valve. In this embodiment, the release member includes a segment having flat and an arcuate portion. When the flat is aligned with the spring biased check valve, the valve element forming part of the check valve is allowed to engage its associated seat. When the release member is rotated, the arcuate portion engages the check valve, causing it to disengage its seat and allowing residual fluid pressure to be discharged into the drain passage.

Additional features of the invention will become apparent and a fuller understanding obtained by reading the following detailed description made in connection with the accompanying drawings.

DESCRIPTION OF THE PREFERRED EMBODIMENT

Figure 1:
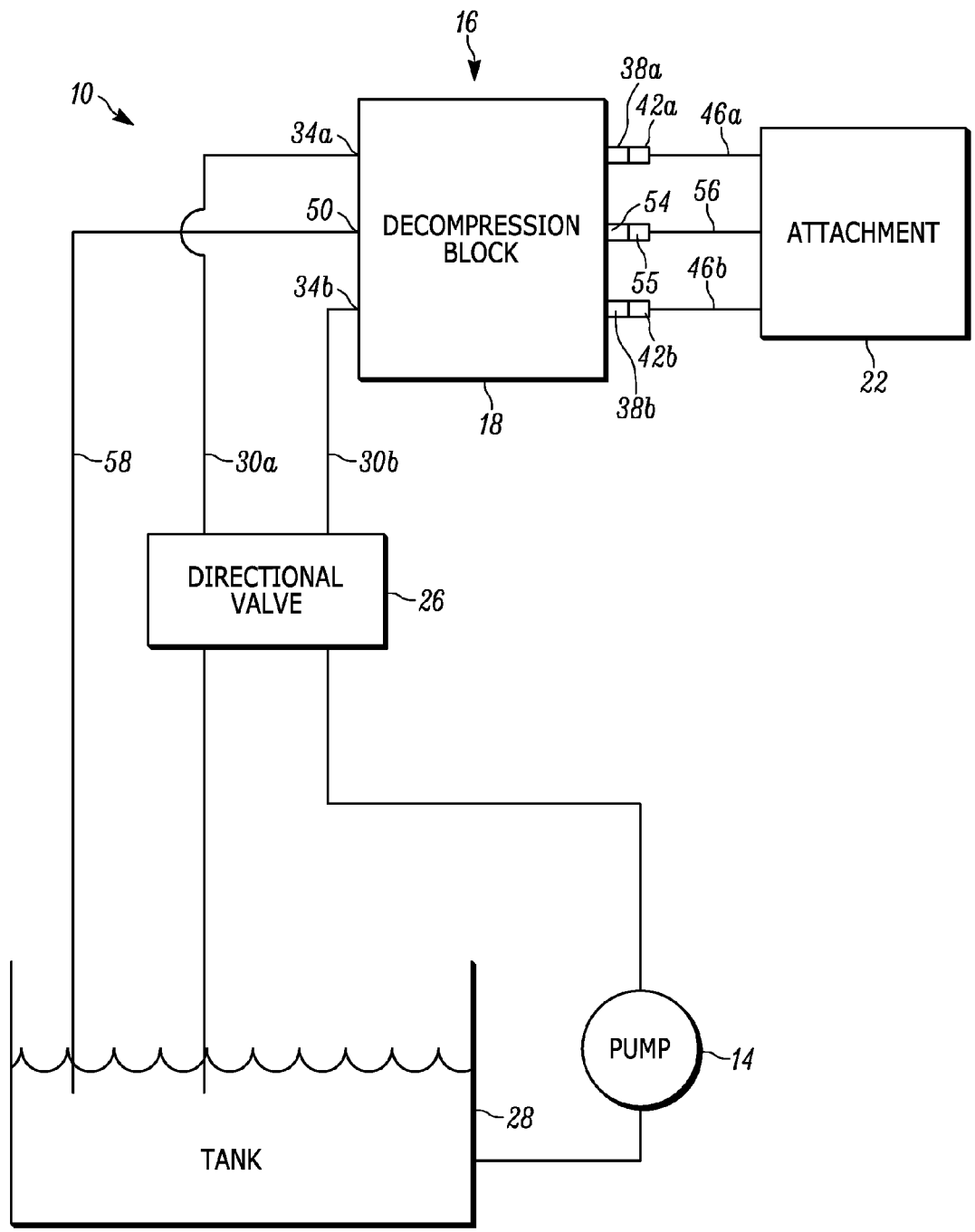
FIG. 1 is a schematic representation of a hydraulic system which includes a decompression coupler block constructed in accordance with a preferred embodiment of the invention.

Referring now to the drawings in detail, and initially to FIG. 1, an exemplary hydraulic circuit 10 generally comprises a pump 14, a coupler assembly 16, and an attachment 22. In the illustrated embodiment, which is particularly suited for use in a mini-excavator, skid-steer loader, or similar type of machinery, there is a directional control valve 26 that directs pressurized fluid from the pump 14, which draws fluid from a tank 28, to either hydraulic line 30a or 30b depending on the desired direction of operation of the attachment 22. Hydraulic lines 30a and 30b are connected to the coupler system 16 which includes a decompression block 18, constructed in accordance with the present invention. More particularly, the lines 30a and 30b are connected to block ports 34a and 34b, respectively. Block ports 34a and 34b are connected internally via the block 18 to block couplers 38a and 38b, respectively.

In the illustrated embodiment, the coupler 38a is a male fitting and coupler 38b is a female fitting, this being in accordance with conventional practice. Companion or mating attachment couplers 42a and 42b connect hydraulic lines 46a and 46b of the attachment 22 to the block couplers 38a and 38b. A motor case drain port 50 in the block 18 is connected internally with a motor case drain line coupler 54. The motor case drain line coupler 54 is coupled to a mating motor case drain line coupler 55 and motor case drain line 56.

The motor case drain port 50 is connected to the tank 28 via line 58. As will be described in further detail herein, the motor case drain port 50 also is connected internally with the coupler ports 34a and 34b and couplers 38a and 38b for releasing pressure from the system 10.

In operation, the pump 14 provides pressurized fluid from the tank 28 to the directional control valve 26. Depending on the desired direction of operation, the directional control valve 26 directs the pressurized fluid to either hydraulic line 30a or 30b. By directing the fluid to one or the other of the hydraulic lines 30a and 30b the direction of operation of the attachment 22 can be reversed. Thus, either hydraulic line 30a or 30b can supply fluid to the attachment 22 while the other hydraulic line not supplying fluid acts as a return line to return the fluid to the tank 28. The motor case drain is provided for use with auxiliary equipment that require a low pressure return, such as for draining fluid from a motor case in the auxiliary equipment. However, as will become apparent from the following description, the motor case drain port 50 and line 58 serve a further function of providing a low pressure return path to the tank 28 for fluid bled from the high pressure flow lines by means of the herein described decompression valving and associated circuit constructed in accordance with a preferred embodiment of the invention.

As previously mentioned, a common practice is to use a variety of interchangeable attachments 22 with an auxiliary hydraulic system 10 of a skid-steer loader or similar type of machinery. Thus, the coupler block 18 of the hydraulic system 10, which functions as a coupling system, provides a convenient interface for changing attachments 22 by providing a single location for connecting and disconnecting the hydraulic lines of the attachment 22 to the auxiliary hydraulic system 10. Residual pressure, however, often remains in the system 10 after an attachment 22 is operated, and this can make it difficult to disconnect and/or connect the attachment 22. In addition spillage of hydraulic oil can also occur, which is undesirable. Further, thermal pressure buildup in the attachment 22 and/or auxiliary hydraulic system 10 can be an impediment to connecting an attachment 22.

FIGS. 2A, 2B, 3 and 4 illustrate three preferred embodiments of a decompression coupling block constructed in accordance with a preferred embodiment of the invention. The embodiment of the decompression coupler block 18 shown in FIG. 2 includes a pressure release member 100 which is pulled in order to release residual pressure within the coupling block 18. In the embodiment of the coupling block 18' shown in FIG. 3, a pressure release member 100' is pushed in order to release residual pressure within the decompression block. In the embodiment shown in FIG. 4, a pressure release member 100" is rotated.

Figure 2A:
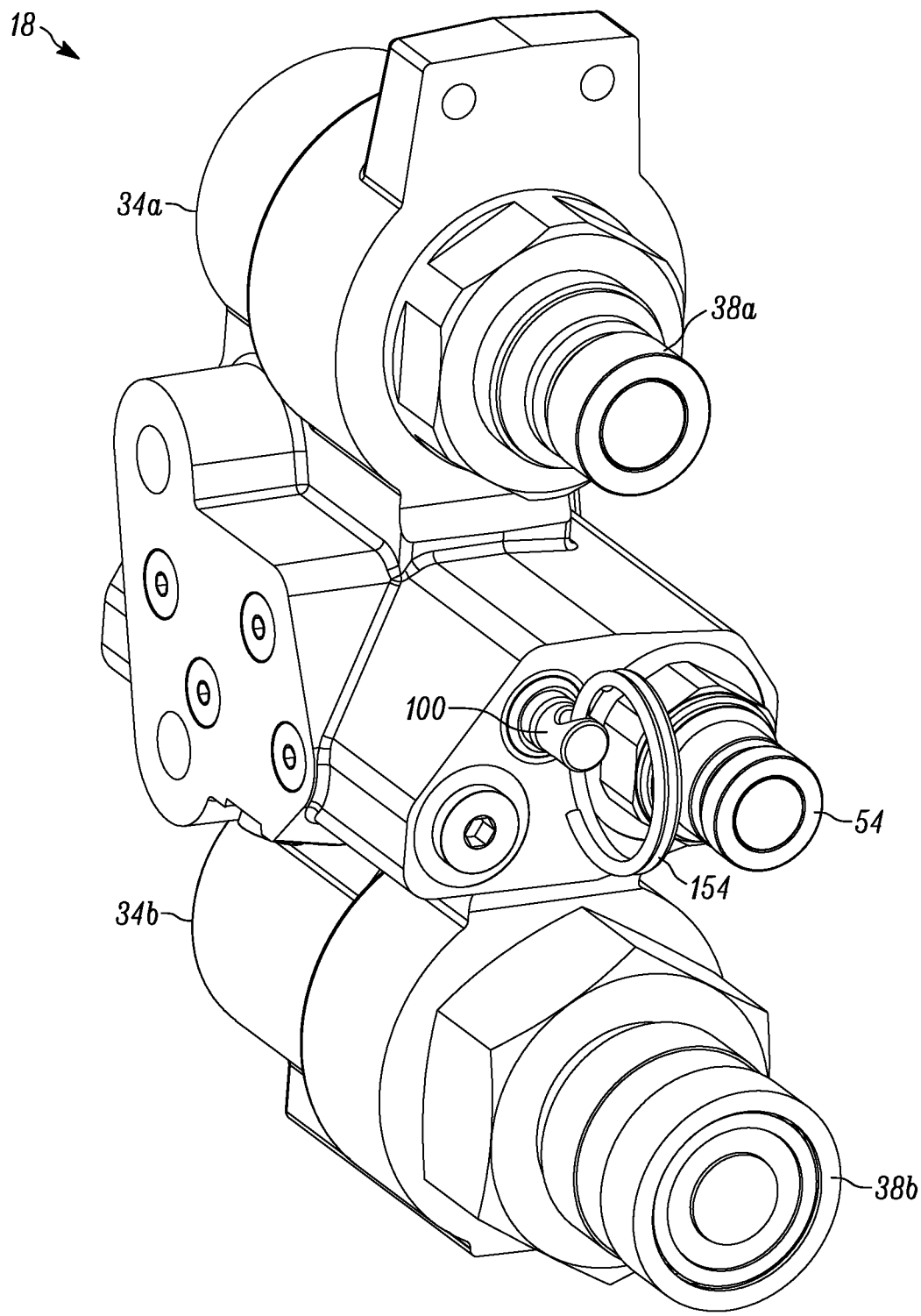
FIGS. 2A and 2B are front and rear perspective views of a decompression coupling block constructed in accordance with one embodiment of the invention.

To simplify the description, components common to all three embodiments will be given the same reference character. As seen in FIG. 2A, the decompression block 18 includes quick coupling fittings 38a, 38b by which the hoses of an associated attachment 22 (FIG. 1) are attached to the coupling block 18. In the illustrated embodiment the fitting 38a is a male fitting and the fitting 38b is a female fitting. The couplers may be of various configurations that are known in the art.

Figure 2B:
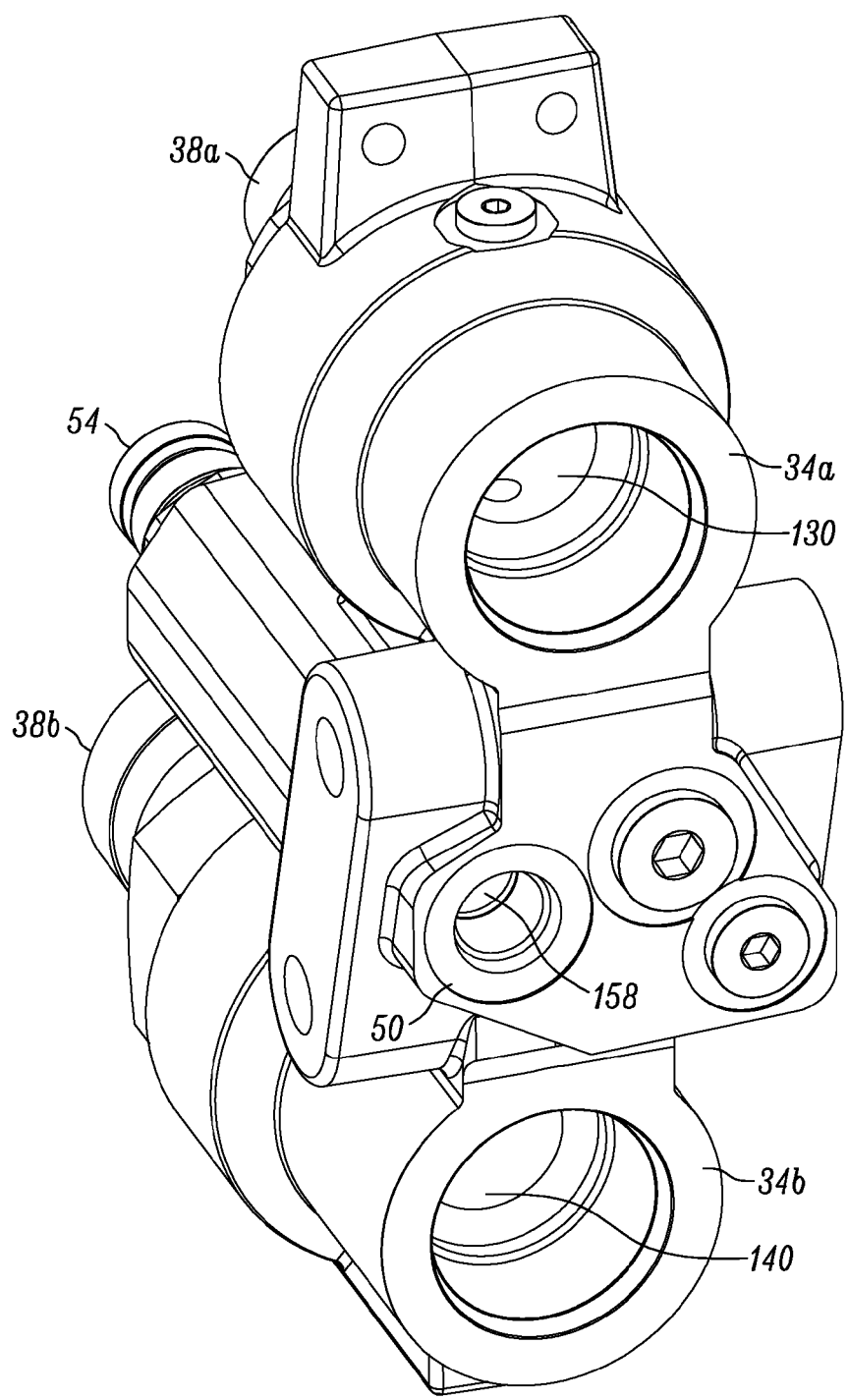

The view shown in FIG. 2B is applicable to all three embodiments. As seen in FIG. 2B, the decompression block 18 (in all three embodiments) includes fluid pressure ports 34a, 34b which are suitably connected to the directional valve 26 shown in FIG. 1 or other suitable component of the hydraulic system 10. Fluid pressure communicated to the ports 34a, 34b are communicated to the associated couplers 38a, 38b (shown in FIG. 2) and to hose assemblies attached to the couplers. In general, rigid piping such as metal conduits are connected to the ports 34a, 34b and, as seen in FIG. 1, are connected to a hydraulic control device such as a directional valve 26.

According to the invention, prior to coupling a hose assembly to the decompression block 18 or decoupling a hose from the compression block 18, residual pressure within the decompression block is released and discharged to the drain conduit 58, which is shown in FIG. 1. With the disclosed decompression block, uncontrolled release or leakage of hydraulic fluid is substantially reduced or inhibited.

Figure 7A:
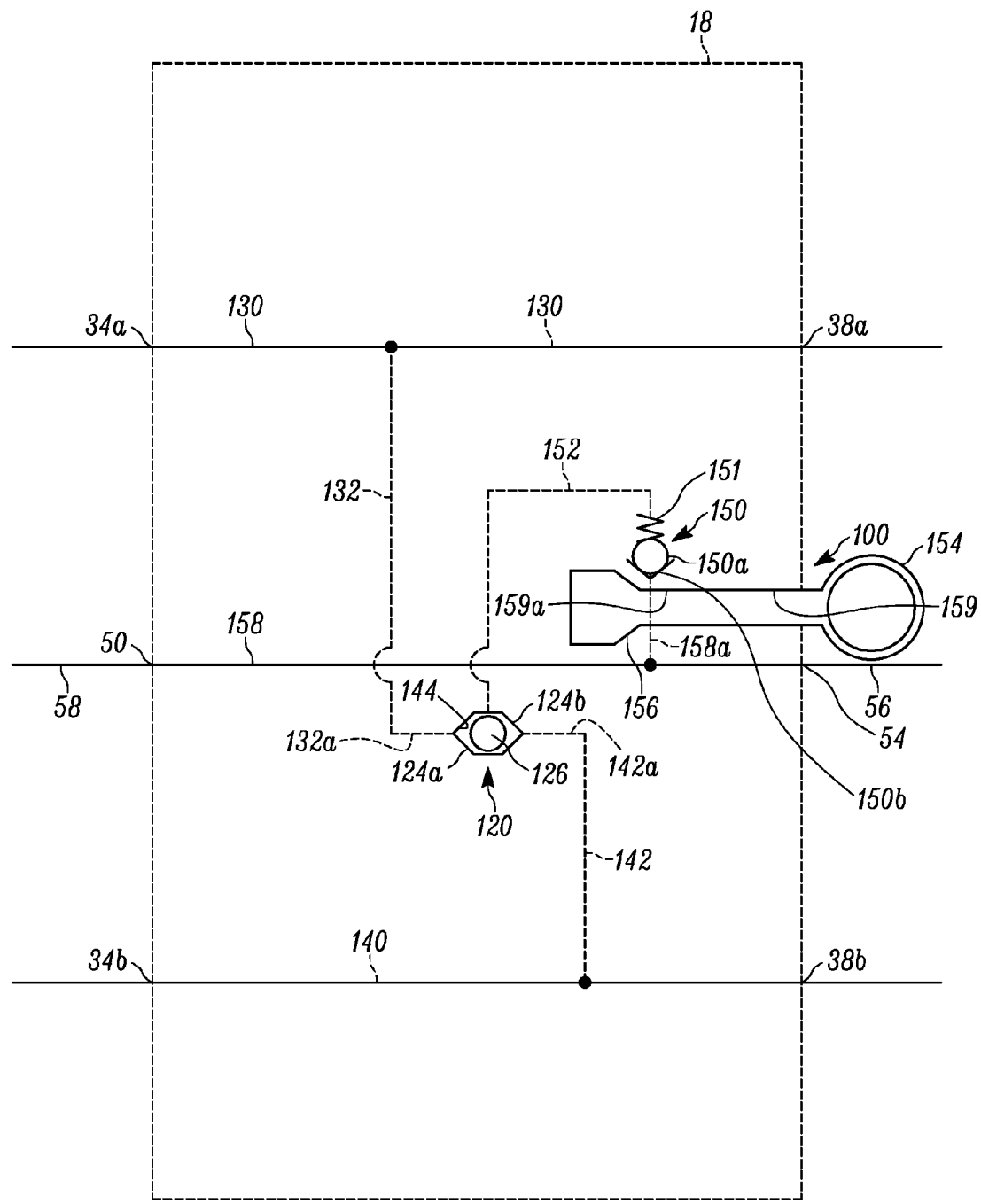
FIG. 7A illustrates, schematically, the decompression coupling block shown in FIG. 2A.
Figure 7B:
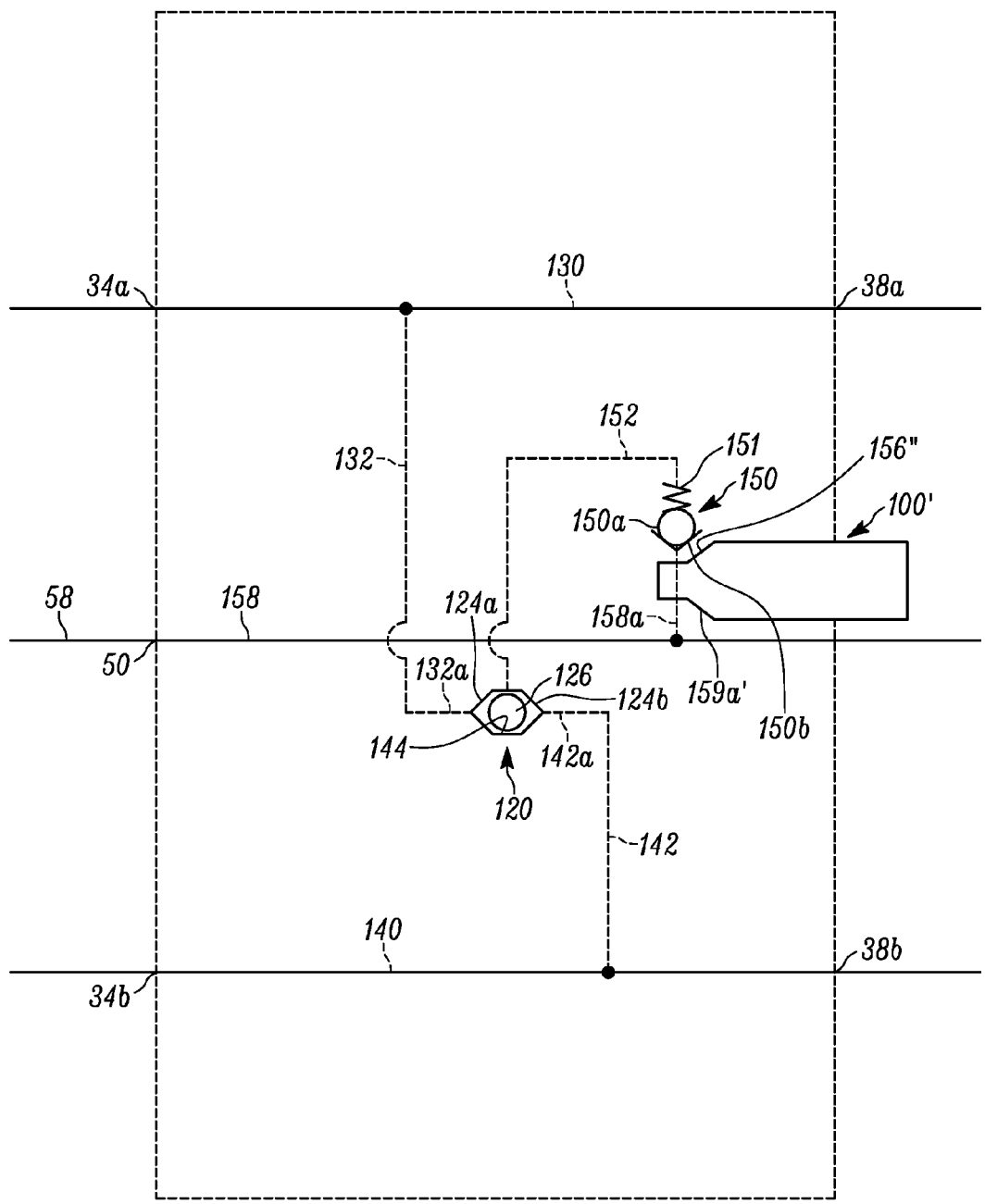
FIG. 7B illustrates, schematically, the decompression coupling block shown in FIG. 3.

FIG. 7A illustrates, schematically, the operation of the pressure relief/discharge function. The decompression block 18 includes a shuttle valve 120, which includes a pair of opposed valve seats 124a, 124b. A shuttle ball 126 is engageable with either seat. The seat 124a communicates with the fluid pressure in a passage 130 which communicates the port 34a with the upper coupler 38a (as viewed in FIG. 7) via a branch passage 132. The seat 124b communicates the fluid pressure in a passage 140, which communicates the port 34a with the lower coupler 38b (as viewed in FIG. 7A) via branch flow passage 142. The shuttle valve 120 includes a chamber 144 which communicates with a spring biased ball valve 150 via discharge passage 152. As seen best in FIGS. 8A and 8B, the ball valve 150 includes a ball 150a that is urged towards an associated seat 150b by a compression spring 151. As seen in FIG. 7A, the pressure relief operating member 100 is transversely movable and slidably received within the decompression block 18. When the member 100 is pulled by the pull-ring 154, a distal end of the member 100, which includes a frustoconical or tapered section 156 engages the ball 150a and pushes it off its seat 150b, thereby relieving any pressure in the branch passage 152. The seat 150b of the ball valve 150 communicates with connected internal discharge passages or return passages 158, 158a which allows any fluid discharged through the ball valve 150 to return to the tank 28 via return passage 158a which communicates with the return line 58.

The shuttle valve 120 operates to block the flow of fluid pressure from one coupler to another. In particular, if the upper coupler passage 130 has a residual pressure that is higher than the residual pressure in the lower coupler passage 140, the ball 126 will be urged towards the right (as viewed in FIG. 5A) and engage the seat 124b, thus blocking flow to the lower coupler passage 140. When the release member 100 is pulled, thereby unseating the ball valve 150a from its associated seat 150b, any fluid pressure in the fluid passage 130 and the branch passage 132 will be discharged to the drain conduit 58 (FIG. 1). If, after discharging pressure from the upper coupler passage 130, a residual pressure exists in the lower coupler passage 140, this residual pressure will shift the ball 126 valve towards the left, thereby causing the ball 126 to engage the seat 124a and the residual pressure in the branch conduit 142 will be discharged through the ball valve 150 to the return conduit 58.

Figure 5:
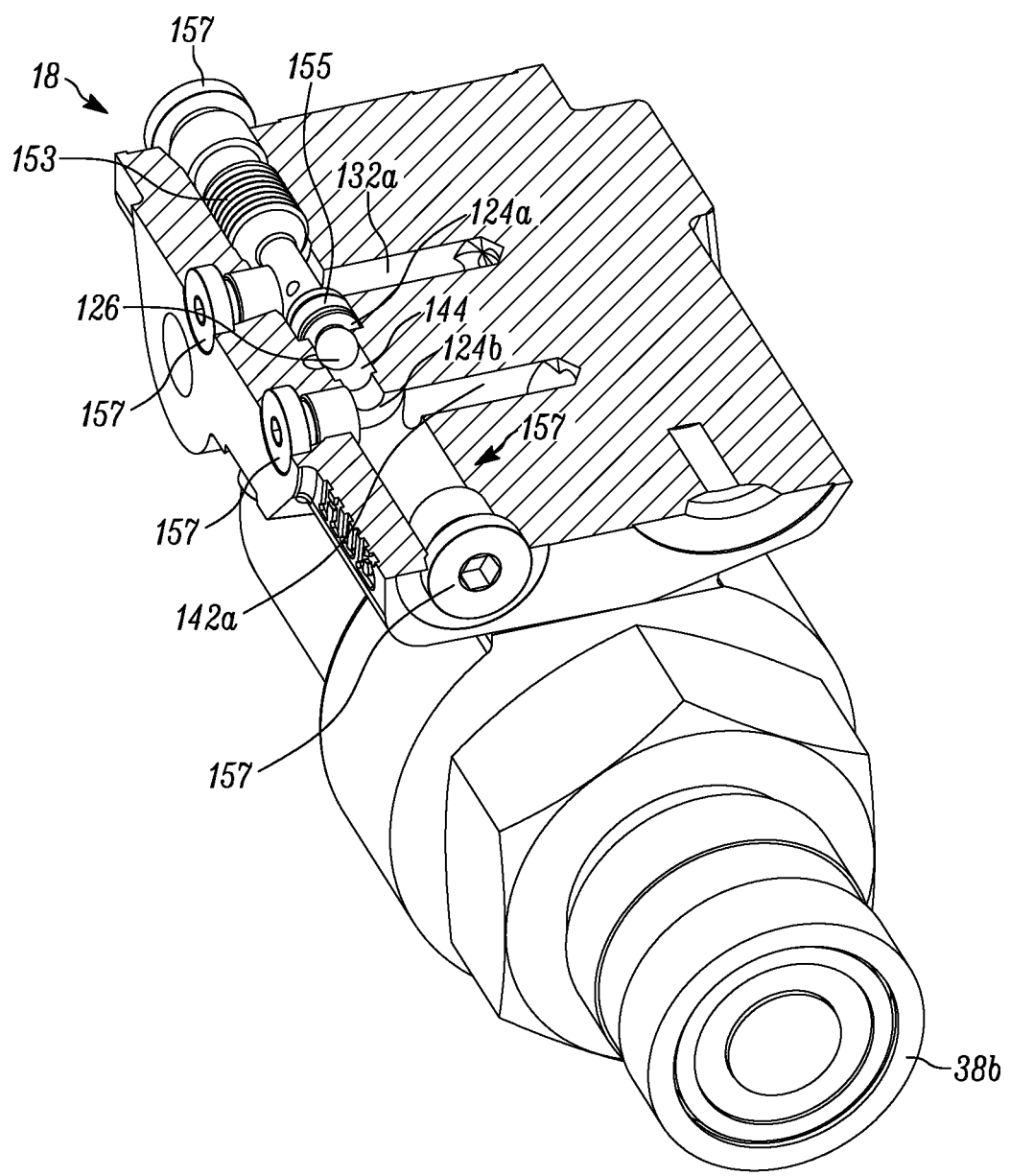
FIG. 5 is a sectional view of the decompression coupling blocks shown in FIGS. 2A, 3 and 4.
Figure 5A:
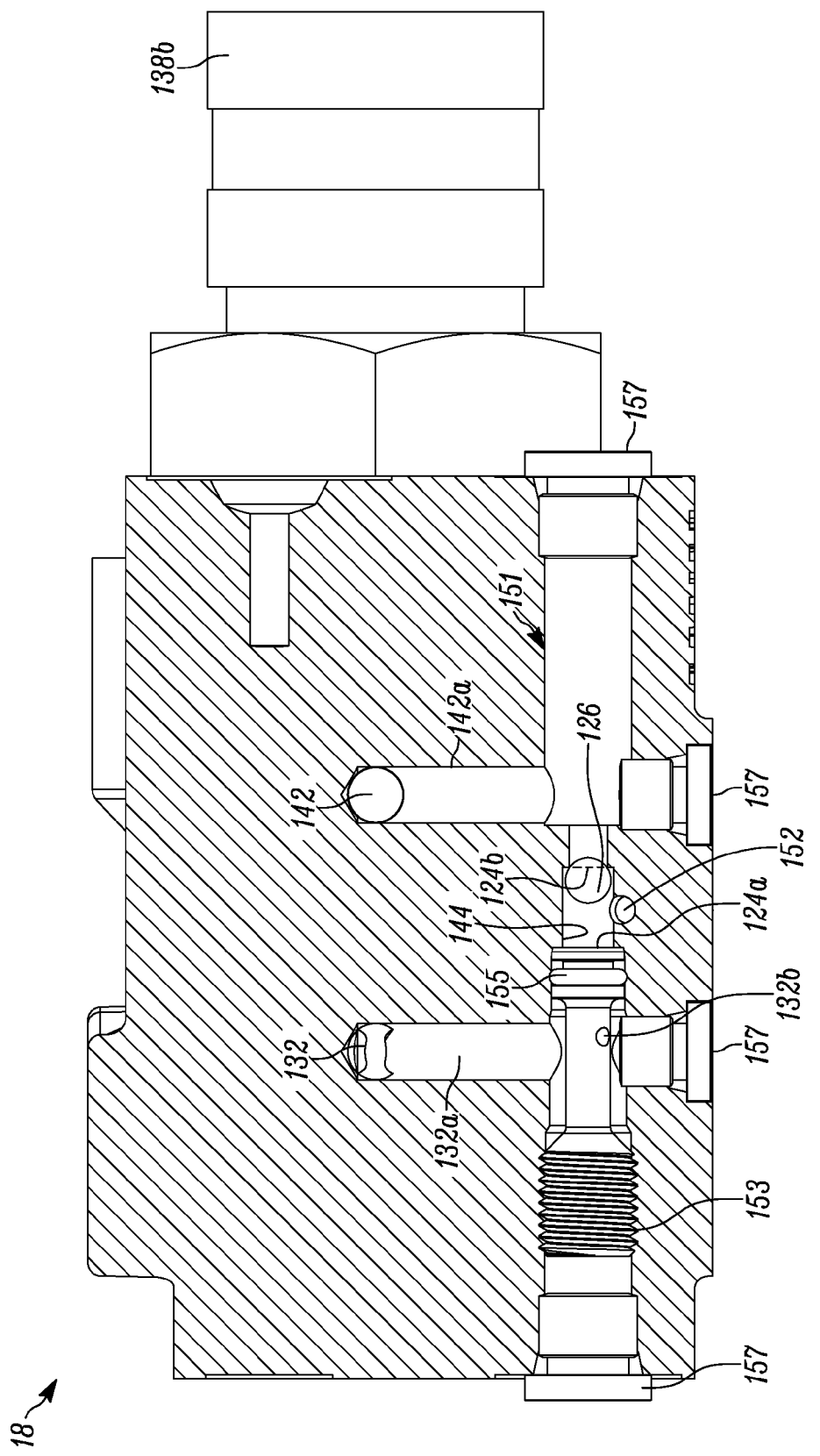
FIG. 5A is a top view of the sectioned decompression coupling block shown in FIG. 5.

FIGS. 5 and 5A illustrate the mechanical details of the components shown schematically in FIG. 7A. As seen in these Figures, the shuttle chamber 144 is formed by a drilled passage indicated generally by the reference character 151. The drilled passage 151 is a multi-step bore, one of the steps defining the seat 124b that is engageable by the ball valve 120. The seat 124a is formed by a threaded insert 153 which is threaded into a threaded segment of the bore 151 and which includes an O-ring 155 which seal the insert 153 to the valve body. The chamber 144 is defined by a bore segment that extends between the seats 124a, 124b. The passages 132, 142, which communicate with the respective seats 124a, 124b are formed by drill passages shown in FIG. 5 which include intersecting drilled passages 132, 132a and intersecting drill passages 142, 142a, as seen best in FIG. 5. Suitable plugs 157 are used to close and seal the drilled passages. As seen best in FIG. 5A, an internal passage (not shown) in the insert 153 communicates with the passage 132a via a cross-drilled passage 132b. When the ball 126 is not engaging the seat 124a, the chamber 144 communicates with the passage 132a via the internal passage in the insert 153 and the cross passage 132b.

Figure 8A:
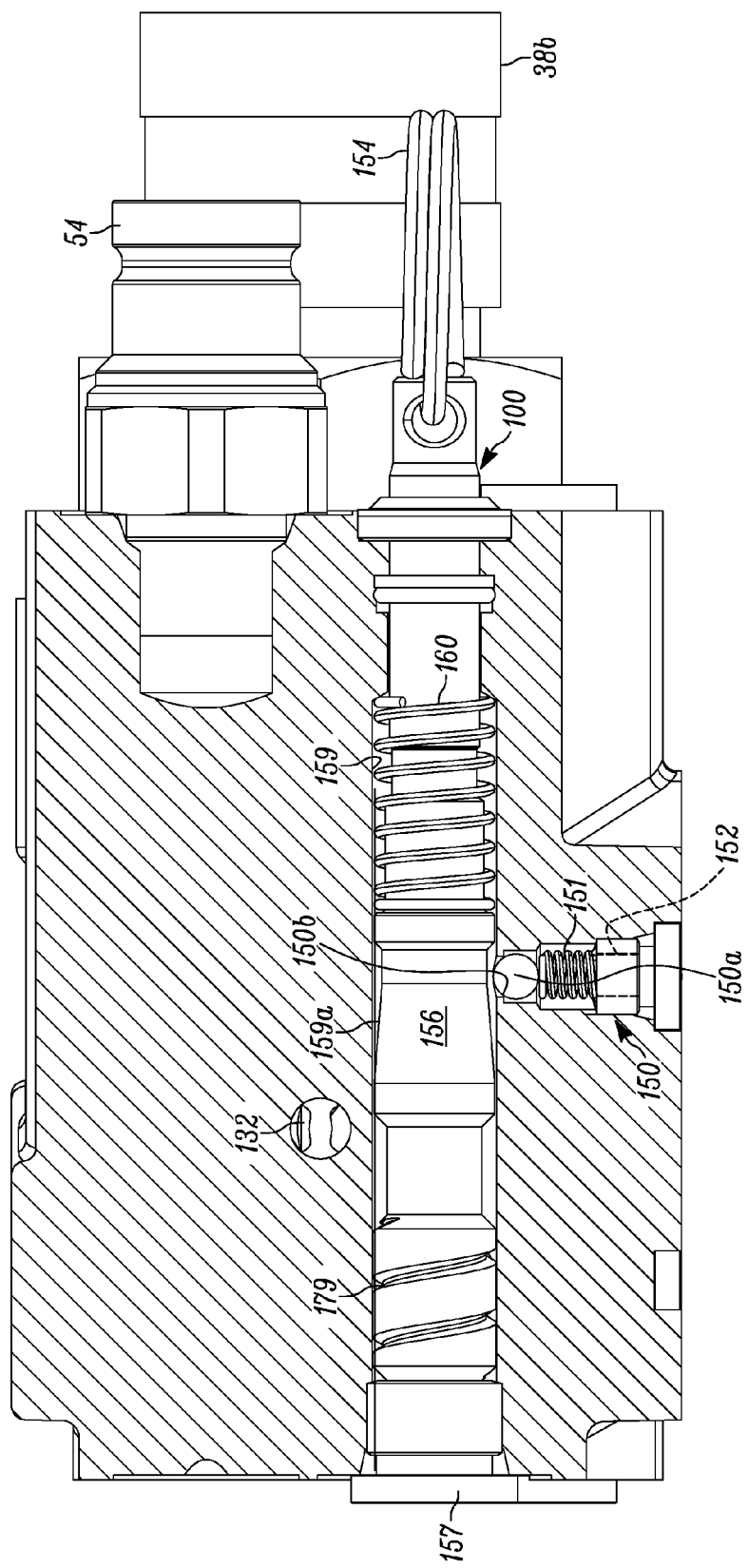
FIGS. 8A and 8B are additional partially sectional views of the decompression coupling block shown in FIG. 2A.
Figure 8B:
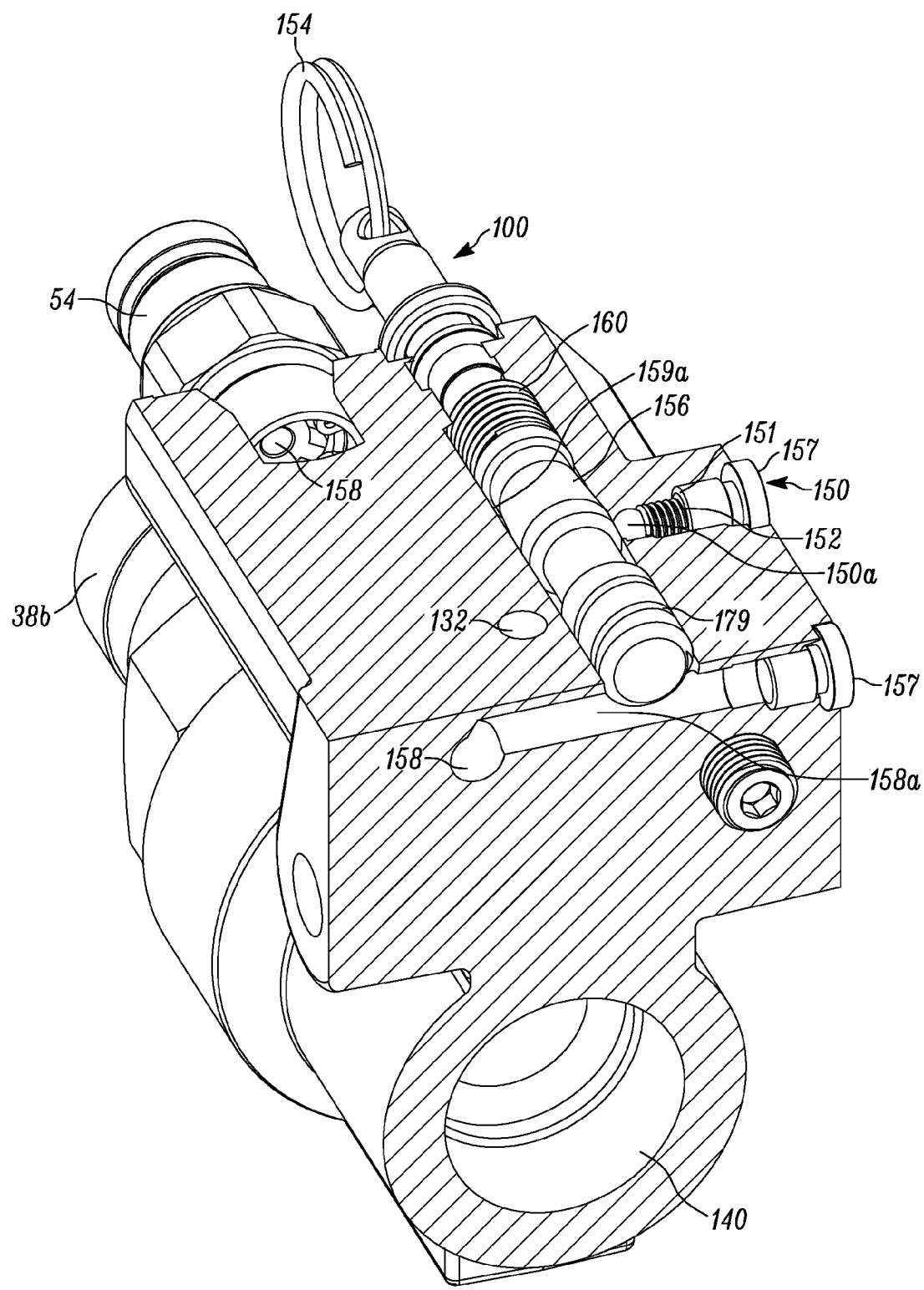
Figure 9A:
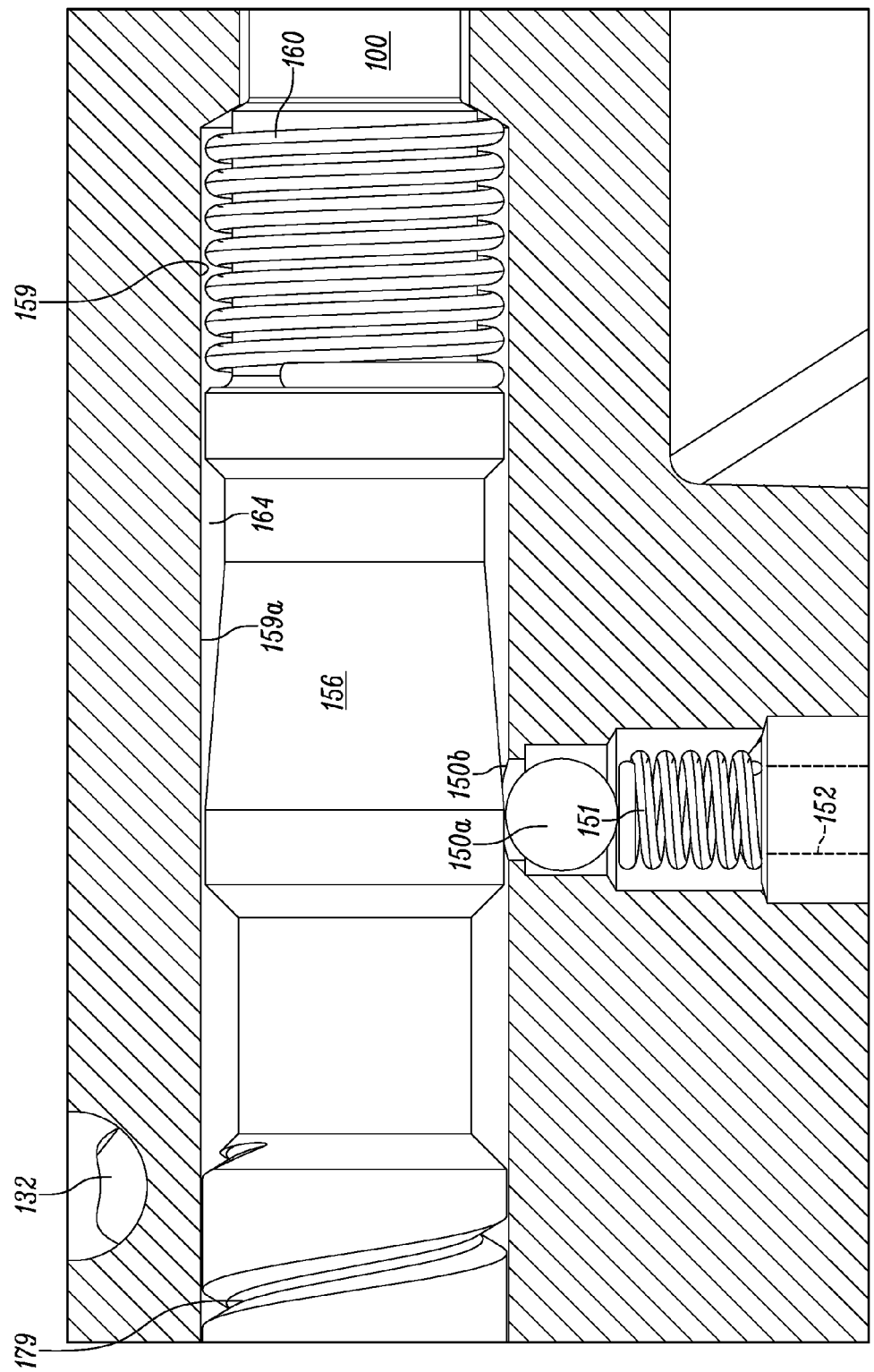
FIG. 9A is an enlarged, partially fragmentary view of the decompression coupling block shown in FIG. 8A; and, FIG. 9B is a partial fragmentary view showing another embodiment of a valve element forming part of the decompression block.

FIGS. 8A and 8B are additional sectional views of the decompression block and illustrate the details of the pressure release member 100 and associated components that it interacts with. As seen in these two Figures, the release member 100 is slidably mounted within a multi-step bore 159 machined into the valve body. A seen in FIG. 8A, a spring 160 biases the release member 100 towards the left, as viewed in FIG. 8A. The release member 100 includes a tapered or frustoconical segment 156. The ball valve 150, which was described previously, includes a check ball 150a which is engageable with the seat 150b. A peripheral segment of the ball 150a extends into the bore 159 so that when the release member is pulled to the right, the tapered segment 156 eventually engages the ball periphery and pushes it downwardly (as viewed in FIG. 8A) thus causing it to disengage its associated seat 150b (the disengaged position is shown in FIG. 9A). When the check ball 150 disengages its seat, it communicates the return passage 152 with a region 159a of the bore 159 which, in turn, communicates with the return passage 158a (shown in FIG. 7A). When the pull ring 154 is released, the spring 160 returns the release member to the position shown in FIG. 8A at which the ball 150a engages its associated seat 150b. In the preferred embodiment, grooves 179 in the release member (FIGS. 8A and 9A) facilitate the communication of the region 159a with the return passage 158a.

Figure 3:
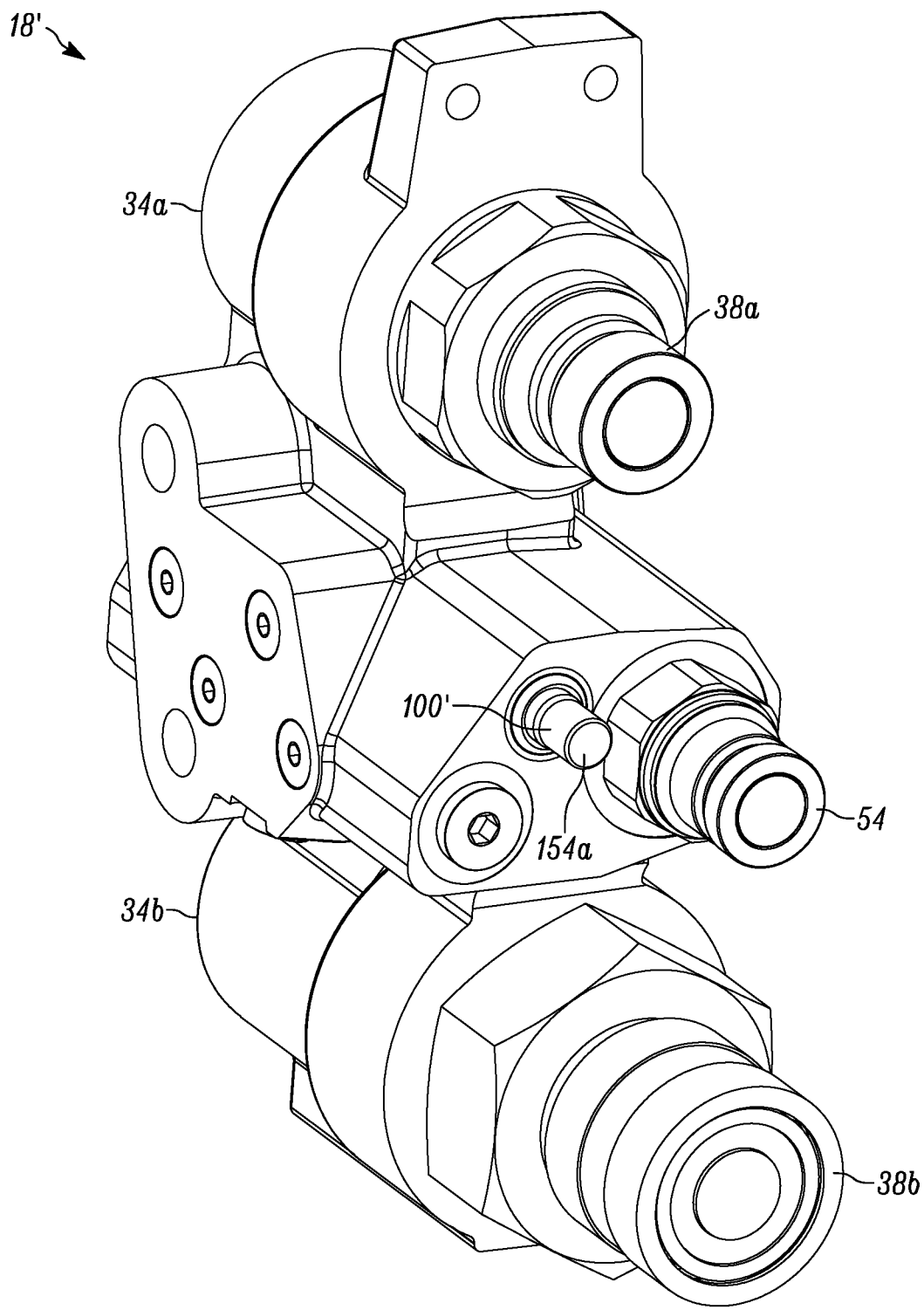
FIG. 3 is a front perspective view of a decompression coupling block constructed in accordance with another embodiment of the invention.
Figure 4:
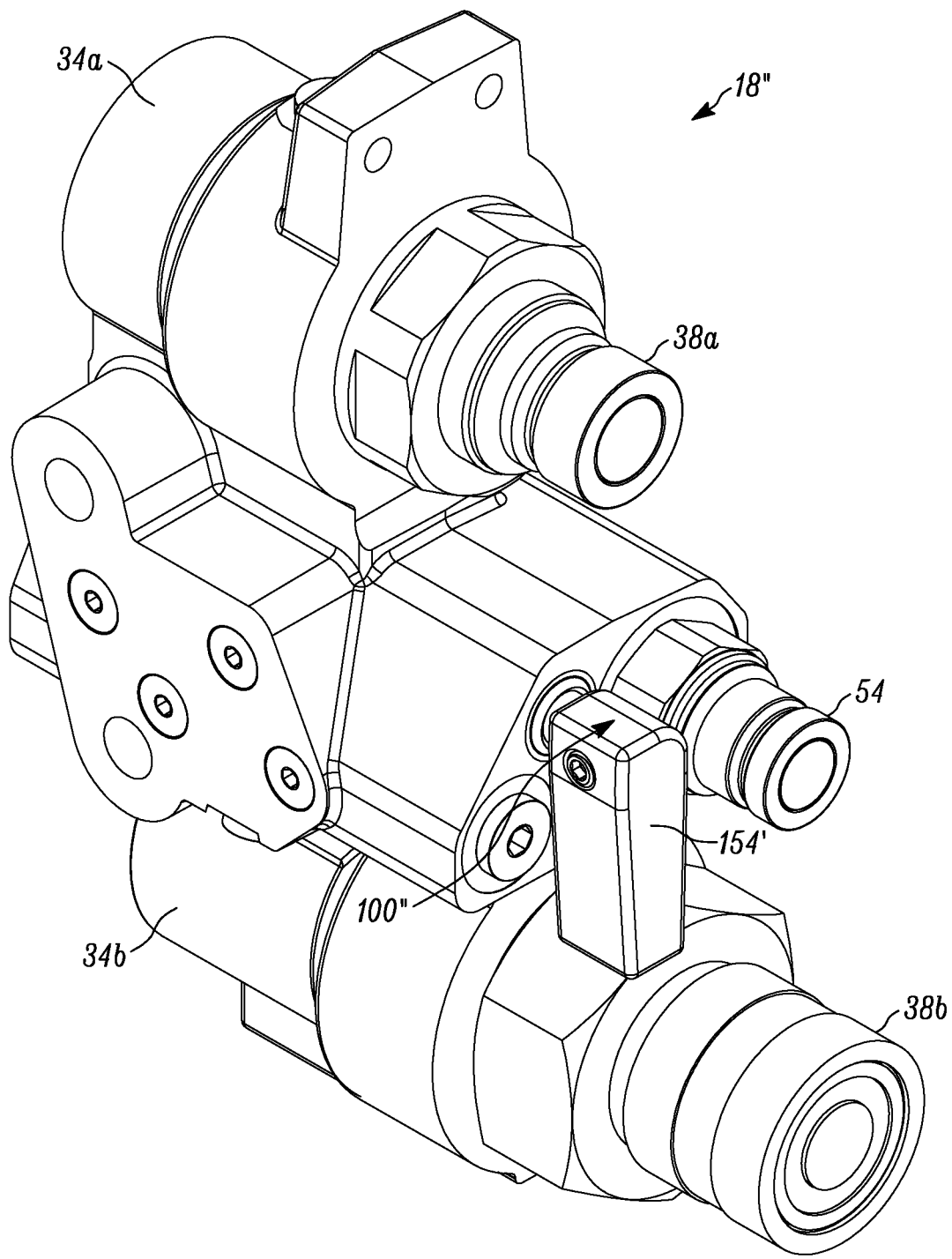
FIG. 4 is a front perspective view of a decompression coupling block constructed in accordance with another embodiment of the invention.
Figure 6A:
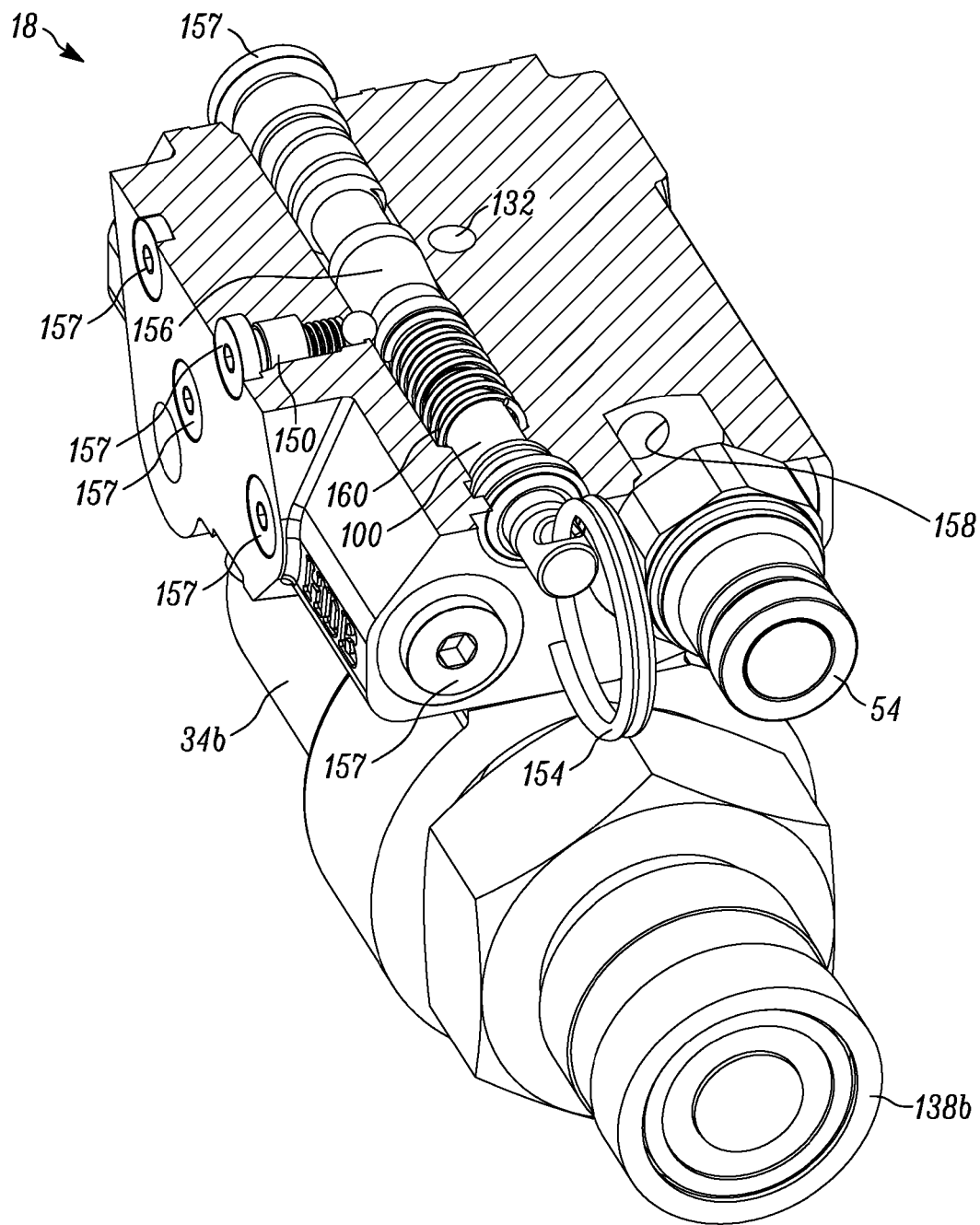
FIG. 6A is a sectional view of the decompression coupling block shown in FIG. 2A.
Figure 6B:
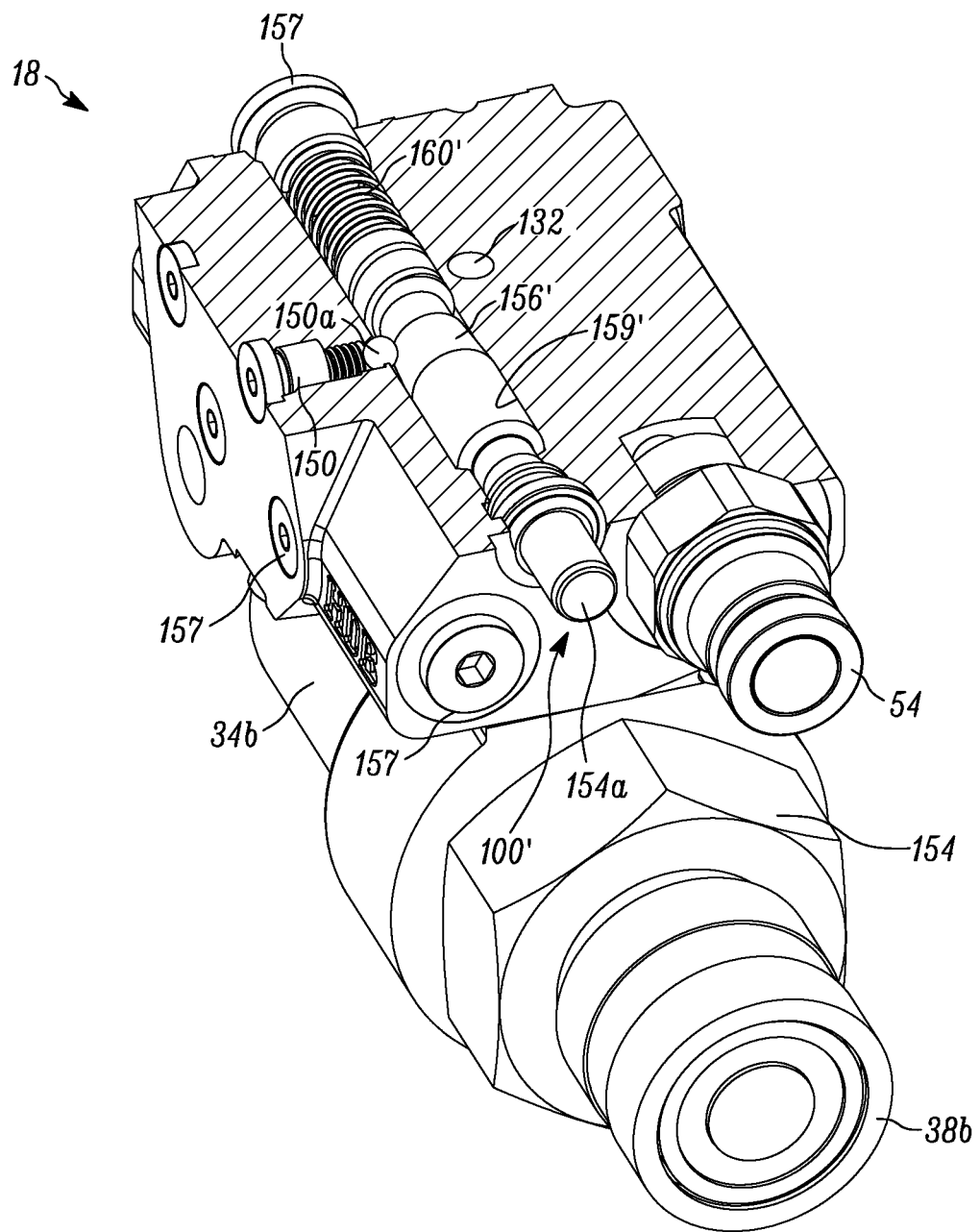
FIG. 6B is a sectional view of the decompression coupling block shown in FIG. 3.

The alternate embodiments of the decompression block shown in FIG. 3 and FIG. 4 operate in a similar fashion. In the embodiment shown in FIG. 3, the pressure relief operating member 100' is pushed and moved inwardly with respect to the decompression block 18. The release member 100' has an end portion 154a that extends outside the valve body (FIG. 6B). As seen best in FIGS. 6B and 7B, the operating member 100' includes a tapered or frustoconical, camming surface 156' which engages and unseats the ball valve 150a when the operating member 100' is moved towards the left as viewed in FIG. 7B. In both embodiments, the shuttle valve 120 operates to communicate the coupler passage with the higher pressure to the discharge passage 158 when the ball 150a is unseated.

Figure 6C:
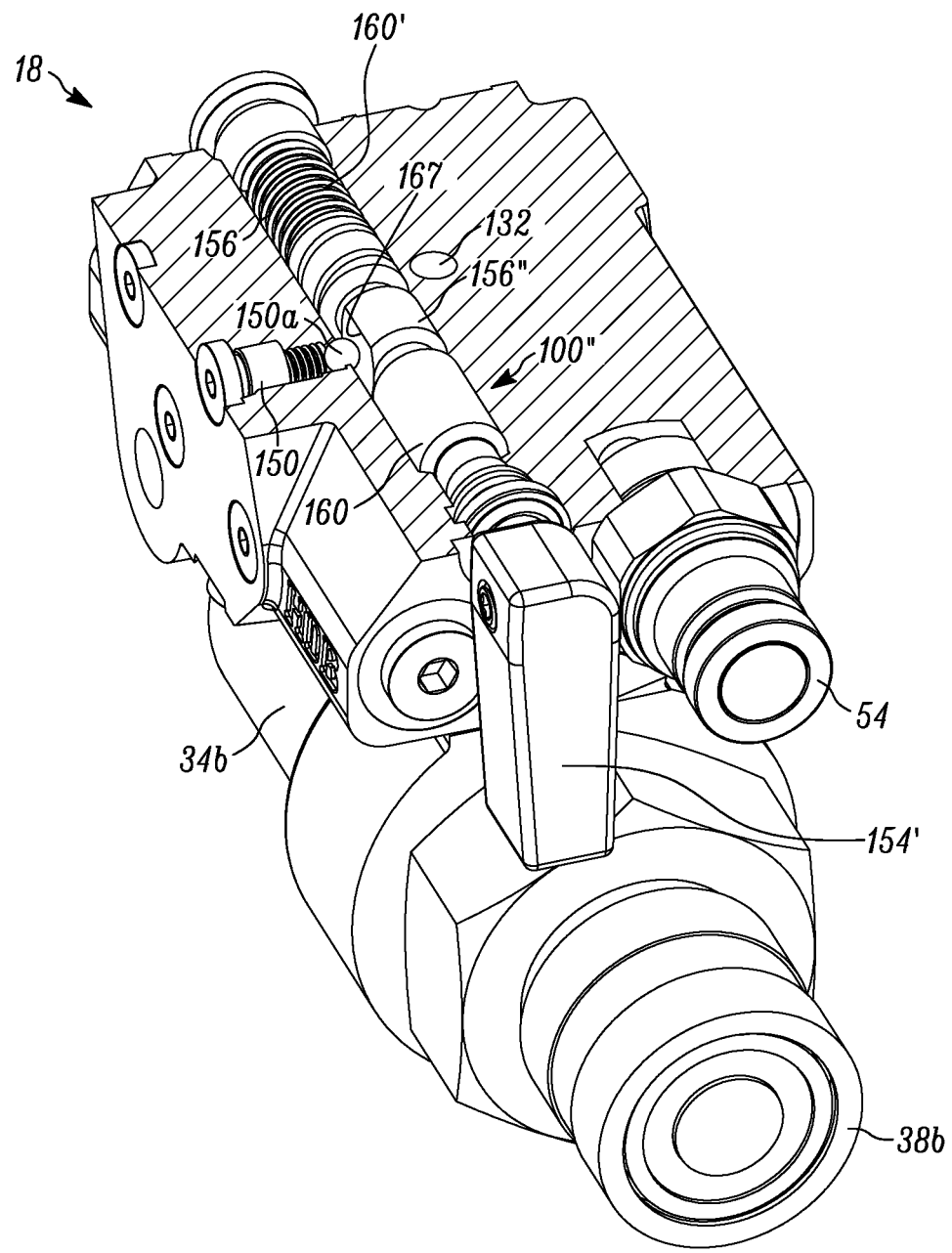
FIG. 6C is a sectional view of the decompression coupling block shown in FIG. 4.

FIGS. 4 and 6C illustrate the third alternate embodiment for the invention. In this embodiment, an operating member 100" is rotated by an operating lever 154' in order to release the residual pressure. As seen best in FIG. 6C, the operating member 100" includes a segment 156'" which includes a flat 167. As seen in FIG. 6C, with the flat 167 in the illustrated position, the ball 150a is disengaged by the operating member and is allowed to engage its associated seat 150B (shown best in FIG. 8A). By rotating the operating member 100'" using the associated lever 154', the ball 150a is unseated as the flat moves out of its position shown in FIG. 6C and a circular or arcuate portion of the operating member 100" engages the ball 150a, thus pushing it off its seat 151b. After the residual pressure is released, the operating lever 154' is rotated counterclockwise so that the flat 167 is the position shown in FIG. 6C, at which the ball 150a is allowed to reengage its associated seat 150b. The present invention also contemplates the use of a suitable spring, such as a torsion spring to cause the operating member 100" to return to its normal operating position shown in FIG. 6C whenever the lever 154' is released.

FIGS. 8A, 8B and 9A show additional details of the pull-type pressure relief member 100. As seen best in FIG. 8A, the plunger 100 is spring biased towards the left as viewed in FIG. 8A. To release residual pressure within the decompression block, the pull-ring 154 attached to the release pin 100 is pulled and when sufficient force is applied to the pull ring to overcome the spring force applied by the spring 160, the release pin 100 moves rightwardly causing the tapered surface 156 to engage and unseat the spring biased check ball 150a. Unseating the check ball 150a allows fluid pressure to be discharged into the region 159a surrounding the frustoconical segment of the release pin member 100, which communicates with the discharge passage 158 (the passage 158 can be seen in FIG. 8B and is shown schematically in FIGS. 7A and 7B).

Figure 9B:
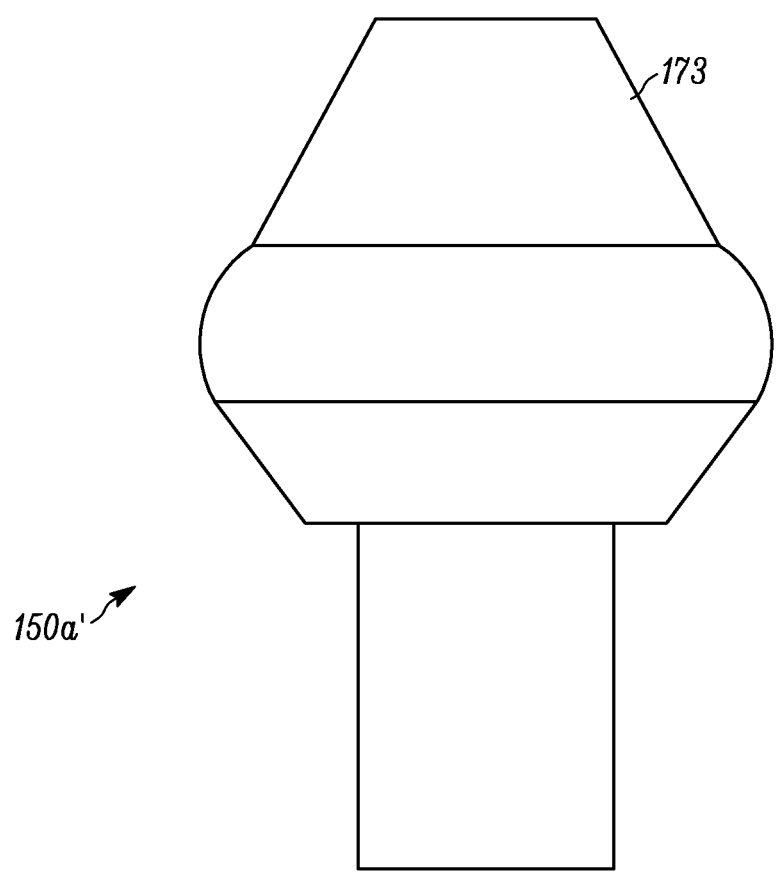

FIG. 9B discloses information regarding an alternate embodiment of the invention. In particular, the embodiments shown in FIGS. 6A, 6B and 6C include a ball 150A as the valve element for controlling the discharge of fluid to the return port 50 (via the return passages 158, 158a). FIG. 9B illustrates a poppet 150a' that may be substituted for the ball 150a. Those skilled in the art will recognize that to substitute the poppet 150a' for the ball 150a, slight modifications will have to be made to the valve 150 so that the poppet 150a' is reciprocally movable towards and away from an associated seat similar to the seat 150b. In addition, the poppet 150a' would be spring biased towards engagement with its associated seat. When seated, a top surface 173 of the poppet 150a' be engageable by the tapered surface 156 when the pin 100 is moved to the right, as viewed in FIG. 8A.

Although the invention has been described with a certain degree of particularity, it should be understood that those skilled in the art can make various changes to it without departing from the spirit or scope of the invention as hereinafter claimed.

The invention claimed is:

1. A decompression block assembly for coupling a source of hydraulic pressure to a hydraulically operated attachment, comprising:
   a) valve body defining a first port and a second port connectable to hydraulic lines from a source of hydraulic pressure;
   b) said valve body further including first and second hydraulic couplers connectable to first and second hydraulic lines extending from said hydraulically operated attachment;
   c) said valve body defining a first flow passage by which said first port is communicated with said first coupler and a second flow passage for communicating said second port with said second coupler;
   d) said valve body including a drain port and defining a drain passage;
   e) said valve body including a shuttle valve chamber defining spaced apart, opposed valve seats and a shuttle valve element located within said shuttle chamber engageable with said first or second valve seats;
   f) said first valve seat communicating with said first flow passage and said second valve seat communicating with said second flow passage;
   g) under certain operating conditions, said shuttle chamber communicating with said drain passage;
   h) a spring-biased check valve element controlling the communication of said shuttle chamber with said drain passage;
   i) a release member engageable with said spring-biased check valve element and operable to unseat said check valve element to allow said shuttle chamber to communicate with said drain passage when said release member is moved to a residual pressure releasing position;

j) said shuttle valve element engageable with said second seat when a fluid pressure in said first flow passage is greater than a fluid pressure in said second flow passage and said shuttle valve element engageable with said first seat when a fluid pressure in said second flow passage is greater than a fluid pressure in said first flow passage.

2. The decompression block of claim 1 wherein said release member includes a tapered surface which operatively engages said check valve element to cause said check valve element to disengage its associated seat when said release member is moved in a predetermined axial direction, thus communicating said shuttle chamber with said drain passage.

3. The decompression block of claim 1 wherein said release member includes a circular surface that is engageable with said check valve element to cause disengagement of said check valve with its associated seat when said release member is rotated, thus communicating said shuttle chamber with said drain passage.

4. The decompression block of claim 1 wherein said shuttle valve element comprises a check ball.

5. The decompression block of claim 1 wherein said decompression block forms part of a vehicle hydraulic supply system and is rigidly mounted to said vehicle and said hydraulic lines from said vehicle hydraulic system are connected to said first and second ports and said drain port is connected to a hydraulic line communicating with a tank forming part of said vehicle hydraulic supply system.

6. The decompression block of claim 1 wherein said first and second valve seats of said shuttle chamber are axially aligned.

7. The decompression block of claim 1 wherein said spring biased check valve element comprises a poppet valve.

8. The decompression block of claim 1 wherein said spring biased check valve element comprises a check ball.

9. The decompression block assembly of claim 1 wherein said release member is reciprocally movable within a multi-stepped bore defined by said valve body, said release member including a tapered segment engageable with said spring biased check valve element when said release member is moved to a check element engaging position, said tapered segment movable within a return passage region of said multi-stepped bore that communicates with said drain port.

10. The decompression block assembly of claim 9 wherein said release member is moved axially by pulling on an external portion of said valve member to the check element engaging position and is returned to a check element disengagement position by a return spring.

11. The decompression block assembly of claim 9 wherein said release member is moved axially to the check element engaging position by pushing on an end portion of the release member that extends outside of said valve body.

12. The decompression block assembly of claim 9 wherein said release member includes a clearance groove for communicating said return pressure region of said bore with said drain port.

13. The decompression block assembly of claim 1 wherein said release member is rotated within a multi-stepped bore defined by said valve body, in order to engage and disengage said check valve element, said release member including a check element engaging segment that includes an arcuate portion and a flat portion, the flat portion configured to be spaced away from said check valve element when said flat is aligned with said check valve element and further configured to disengage said check valve element when said arcuate portion engages said check valve element.

14. The decompression block assembly of claim 1 wherein said valve body includes another stepped bore, said shuttle chamber defined by a shuttle chamber segment of said another bore that extends between a step in said another bore and an insert threadedly received by said another bore and said step in said another bore defining a first valve seat spaced from said second valve seat that is defined by said insert and said shuttle valve element comprising a check ball located within the shuttle chamber segment of said another bore and engageable with either said first seat or said second seat.

15. A hydraulic connection assembly with a discharge control that is positionable between an on-board hydraulic system of a vehicle and a hydraulically operated attachment, comprising:

a) a valve body attachable to said vehicle including a first and second hydraulic port and at least one drain port;

b) said valve body further including first and second hydraulic couplers connectable to first and second hydraulic lines extending from said hydraulically operated attachment;

c) said valve body defining a first flow passage by which said first port is communicated with said first coupler and a second flow passage for communicating said second port with said second coupler;

d) said valve body defining a drain passage communications with said drain port;

e) said valve body including a shuttle valve chamber defining spaced apart, opposed valve seats and a shuttle valve element located within said shuttle chamber engageable with said first or second valve seats;

f) said first valve seat communicating with said first flow passage and said second valve seat communicating with said second flow passage;

g) under certain operating conditions, said shuttle chamber communicating with said drain passage;

h) a spring-biased check valve element controlling the communication of said shuttle chamber with said drain passage;

i) a release member engageable with said spring-biased check valve element and operable to unseat said check valve element to allow said shuttle chamber to communicate with said drain passage when said release member is moved to a residual pressure releasing position;

j) said shuttle valve element engageable with said second seat when a fluid pressure in said first flow passage is greater than a fluid pressure in said second flow passage and said shuttle valve element engageable with said first seat when a fluid pressure in said second flow passage is greater than a fluid pressure in said first flow passage.

16. The decompression block assembly of claim 15 wherein said check valve element comprises a check ball.

17. The decompression block assembly of claim 15 wherein said check valve element comprising a spring-biased poppet.

* * * * *